(12) United States Patent
Shetty et al.

(10) Patent No.: US 10,360,540 B2
(45) Date of Patent: Jul. 23, 2019

(54) FUEL MEASUREMENT FOR FLEET VEHICLES

(71) Applicant: Hitachi, Ltd., Tokyo (JP)

(72) Inventors: Sanketh Dinakara Shetty, Farmington Hills, MI (US); Sujit Phatak, Farmington Hills, MI (US); Heming Chen, Novi, MI (US)

(73) Assignee: Hitachi, Ltd., Tokyo (JP)

( * ) Notice: Subject to any disclaimer, the term of this patent is extended or adjusted under 35 U.S.C. 154(b) by 385 days.

(21) Appl. No.: 15/205,556

(22) Filed: Jul. 8, 2016

(65) Prior Publication Data

US 2018/0012204 A1 Jan. 11, 2018

(51) Int. Cl.
| | | |
|---|---|---|
| G08B 21/00 | (2006.01) |
| G06Q 20/10 | (2012.01) |
| G01F 23/24 | (2006.01) |
| G06Q 20/20 | (2012.01) |
| G07F 13/02 | (2006.01) |
| G01F 9/00 | (2006.01) |
| G01F 23/00 | (2006.01) |

(52) U.S. Cl.
CPC ........... G06Q 20/102 (2013.01); G01F 23/24 (2013.01); G06Q 20/20 (2013.01); G07F 13/025 (2013.01); *G01F 9/001* (2013.01); *G01F 23/0076* (2013.01)

(58) Field of Classification Search
CPC .............................. G01F 23/24; G06Q 20/102
USPC ......................................................... 340/450
See application file for complete search history.

(56) References Cited

U.S. PATENT DOCUMENTS

| | | | | |
|---|---|---|---|---|
| 2008/0162193 A1* | 7/2008 | Voggenauer | ........... | G06Q 40/08 705/4 |
| 2009/0099724 A1* | 4/2009 | Kranz | ..................... | G01F 1/115 701/33.4 |
| 2009/0109022 A1* | 4/2009 | Gangopadhyay | .. | G01C 21/3407 340/540 |
| 2010/0042340 A1* | 2/2010 | Piszko | .................... | G01F 9/008 702/55 |

* cited by examiner

Primary Examiner — Mark S Rushing
(74) Attorney, Agent, or Firm — Mattingly & Malur, PC (57) ABSTRACT

In some examples, a processor on a vehicle may determine, based at least partially on information obtained from a sensor, that a fuel level of the vehicle is increasing. Further, the processor may determine that the fuel level has stabilized for a threshold time. In addition, the processor may determine an amount of fuel added to the vehicle, and may send, over a wireless network to a computing device, a communication indicating the amount of fuel added. In some cases, the computing device may compare the amount of fuel indicated in the communication from the processor with an amount of fuel indicated in information received from a point-of-sale device for determining a difference.

17 Claims, 8 Drawing Sheets

FUEL MEASUREMENT FOR FLEET VEHICLES

BACKGROUND

Many companies, government agencies, and other entities operate fleets of vehicles such as for transporting employees, providing services, making deliveries, and so forth. These vehicles need to be refueled from time to time. In some cases, a fuel payment card (sometimes also referred to as a "fleet card") may be provided to the operators of these vehicles for use in paying for refueling the fleet vehicles. For instance, the fleet vehicles may be refueled at many commercial gas stations or other fueling stations that are equipped to receive the fuel payment cards as payment for fuel, and in some cases, other goods or services.

Tracking and verifying the fuel purchased and payments made with fuel payment cards may be difficult. For example, fuel gauges typically used in vehicles may only give a rough estimate of the amount of fuel added during refueling. Consequently, it may become tedious to validate the amount of fuel added, such as by cross checking the fuel gauge reading against a receipt or an amount charged on the fuel payment card. This may make it easy for cardholders to commit fraud and/or may lead to discrepancies in account management due to incorrect operation costs, incorrect mileage determinations, or other issues.

SUMMARY

Some implementations include arrangements and techniques for tracking fuel added to vehicles. As one example, based at least partially on information obtained from a sensor, a processor on a vehicle may determine that a fuel level of the vehicle is increasing. Further, the processor may determine that the fuel level has stabilized for a threshold time, and may thus determine an amount of fuel added to the vehicle. The processor may send, over a wireless network to a computing device, a communication indicating the amount of fuel added to the vehicle. In some cases, the computing device may compare the amount of fuel indicated in the communication with an amount of fuel indicated in transaction information received from a point-of-sale (POS) device for determining a difference.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The technology herein includes novel arrangements and techniques for validating a charge on a fleet fuel payment card, such as at the time that a fleet vehicle is refueled. In some cases, the amount charged on the payment card may be verified in near real time based on measurement of the actual amount of fuel added to the fuel tank of the vehicle. For instance, a reporter may be configured on the vehicle to determine the amount of fuel added to the fuel tank, and may provide this information in a communication sent to a computing device over a network. Furthermore, the reporter in the vehicle may use calibration information determined in advance based on the physical configuration of the fuel tank of the fleet vehicle to determine an accurate reading of the amount of fuel added to the fuel tank.

By determining the precise volume of fuel added to the fuel tank and by determining the price per unit volume charged for the fuel at the fueling station, in some examples, the computing device is able to calculate the cost for the detected volume of fuel added to the fuel tank. This cost may be compared to the amount charged to the fuel payment card, and may thereby be used to verify that the charge is accurate. Accordingly, each charge to the fuel payment card can be automatically verified as the charge is made.

In some examples, a fuel gauge sending unit in the vehicle may include a variable resistor whose resistance is dependent on the position of a float in the fuel tank. As the float rises or falls within the fuel tank, the resistance of the variable resistor changes, which changes a current provided to a fuel level indicator. Based on calibration information for the fuel tank and the fuel gauge sending unit, the reporter in the vehicle may be able to accurately determine how much fuel is added to the fuel tank. For example, using the calibration information, the change in current provided to the fuel level indicator and/or the change in resistance in the variable resistor can be equated to a change in the volume of fuel in the fuel tank caused by adding fuel to the fuel tank.

In some cases, the reporter may include an electronic control unit (ECU), a microcontroller, an embedded processor, or other type of processor in the vehicle that is able to receive a sensor value indicative of a current passing through the variable resistor. For instance, when fuel is being added to the fuel tank, the reporter may determine an initial resistance and a final resistance value of the variable resistor, such as based on a change in the current. As one example, an ammeter in communication with the reporter and the variable resistor may serve as a sensor to detect a change in milliamps (mA) of the current resulting from the change in the resistance of the variable resistor.

The change in the current (or change in resistance) may be converted to a volume of fuel based on the calibration information maintained by the reporter. For example, the calibration information may be provided to the reporter in advance, and may be based on the physical configuration of the fuel tank and the sending unit of the fuel gauge for the particular model of fleet vehicle. Accordingly, the calibration information may be determined ahead of time, and may be specific for a respective model of vehicle in the fleet of vehicles. The calibration may be performed precisely such that the reporter is able to accurately determine minute differences in resistances that are equivalent to a corresponding change in the volume of fuel in the fuel tank.

When the reporter determines that fuel has been added to the fuel tank, the reporter may use a communication interface to communicate with a computing device over a network. For instance, the reporter may communicate with a fleet management computing device or a service computing device, which may be configured to receive the fuel amount information from the reporter and receive the fuel quantity and charge information provided by a fueling station point-of-sale (POS) device. For instance, the POS device may provide transaction information including an amount paid and a price per volume of the fuel purchased to a payment card processing computing device or other service computing device, which may forward this information to the fleet management computing device. The fleet management computing device (or alternatively, the service computing device) may validate each charge to the fuel payment card based on comparing the fuel amount information received from the reporter installed in the fleet vehicle with the fuel amount indicated by the transaction information received from the POS device. For instance, if the difference exceeds a threshold amount, a notification may be generated for management, or the like. Accordingly, any discrepancies may be detected and addressed as they occur, rather than trying to identify discrepancies at the end of the day, end of the week, end of the month, etc.

For discussion purposes, some example implementations are described in the environment of a fleet vehicle that includes a processor configured as a reporter for determining and reporting fuel amount information. However, implementations herein are not limited to the particular examples provided, and may be extended to other service environments, other system architectures, other reporter arrangements, other sensor configurations, and so forth, as will be apparent to those of skill in the art in light of the disclosure herein.

Figure 1:
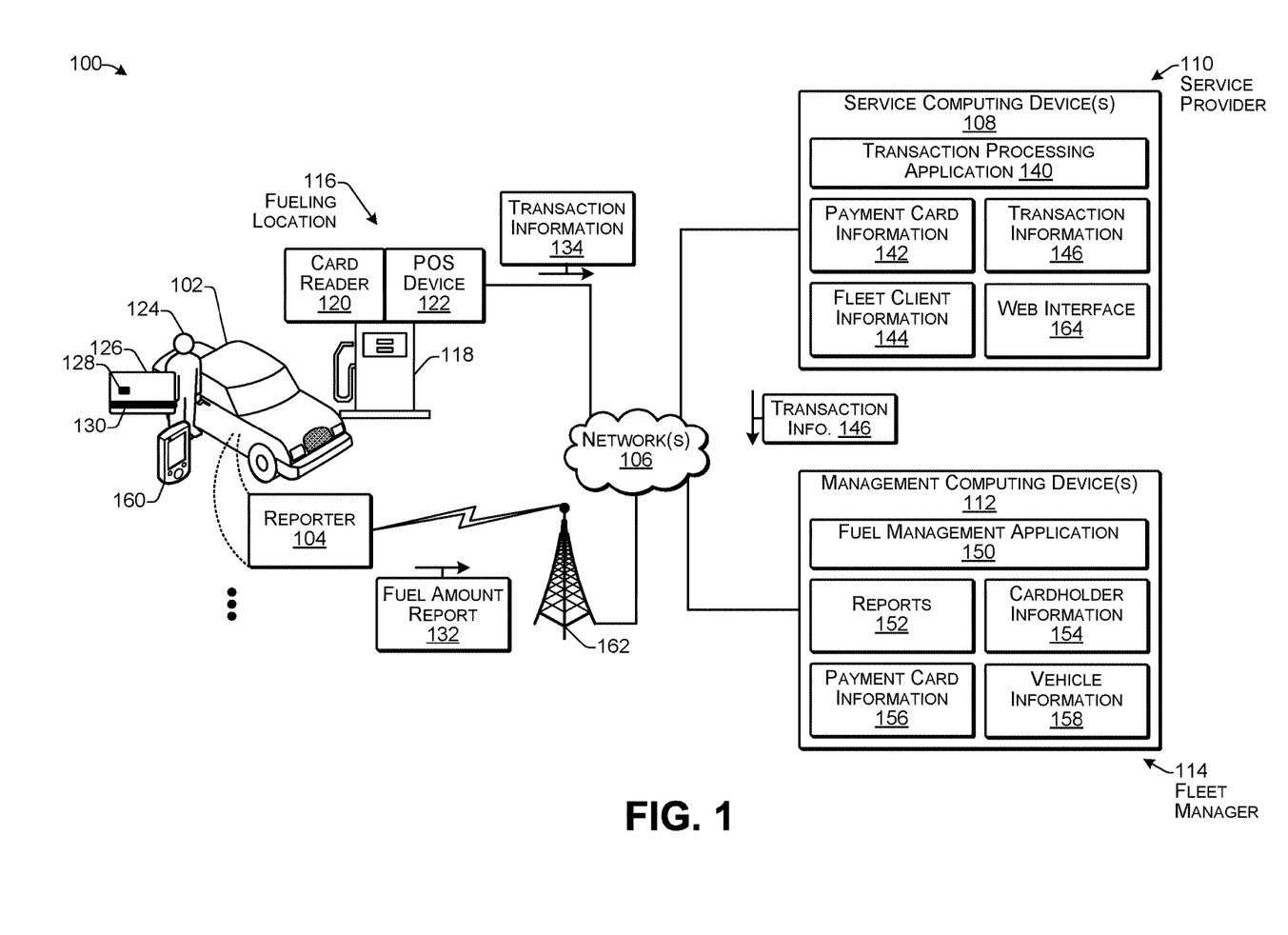
FIG. 1 illustrates an example system enabling fuel measurement according to some implementations.

FIG. 1 illustrates an example system 100 enabling fuel amount tracking according to some implementations. The system 100 includes a plurality of vehicles 102 that may each include a reporter 104 able to communicate over one or more networks 106 with one or more service computing devices 108 of a service provider 110 and/or one or more management computing devices 112 of a fleet manager 114. In addition, the system 100 may include a plurality of fueling locations 116, such as gas stations or the like, that may each include one or more fuel dispensers 118 that are operable for providing fuel to the vehicles 102. Further, a card reader 120 and a point of sale (POS) device 122 may be associated with the fuel dispenser 118 and/or the fueling location 116. The card reader 120 and/or the POS device 122 may be able to communicate through the one or more networks 106 with the service computing device 108 of the service provider 110.

As an example, a cardholder 124, such as the operator of the vehicle 102, or the like, may have a fleet payment card 126 that includes at least one of an RFID tag 128 (radiofrequency identification tag) or a magnetic stripe 130. In some examples, the RFID tag 128 and/or the magnetic stripe 130 may be used to validate the card entries by correlating the payment card 126 with a card identifier, or the like. The cardholder 124 may use the payment card 126 to purchase fuel for the vehicle 102. The card reader 120 may read at least one of the RFID tag 128 or the magnetic stripe 130 to determine an account number or other payment verification information associated with the payment card 126.

Furthermore, while a single vehicle 102 and single cardholder 124 are shown for clarity in this example, in use, a large number of cardholders 124 may use the system 100 for purchasing fuel for a large number of vehicles 102, respectively. In some examples, the fuel may include gasoline, diesel fuel, liquefied petroleum (propane), compressed natural gas, ethanol, hydrogen (including hydrogen cells), biofuel (e.g., bio-diesel), electricity, and the like. Further, as discussed additionally below, in some examples the techniques herein may be applied to electric vehicles, such as those powered by rechargeable batteries.

The cardholder 124 may use the payment card 126 to pay for fuel at the fueling location 116. As the fuel is added to the vehicle 102, the reporter 104 may track the amount of fuel added to the fuel tank of the vehicle 102. Examples of how the reporter 104 accurately determines the amount of fuel added to the fuel tank are discussed additionally below, e.g., with respect to FIGS. 2 and 4. When the cardholder 124 has completed adding the fuel to the fuel tank, the reporter 104 may send a fuel amount report 132 over the one or more networks 106 to at least one of the service computing device 108 or the management computing device 112. As one example, the reporter 104 may use a wireless communication interface (not shown in FIG. 1), such as a cellular communication interface or other suitable communication interface for sending the fuel amount report 132 to the computing device(s) 108 and/or 112. In some examples, the reporter 104 may communicate with the computing device(s) 108 and/or 112 via one or more application programming interfaces (APIs).

In some examples, the POS device 122 may include a computing device and communication interface that is configured to receive information about the fuel purchase transaction from the card reader 120, the fuel dispenser 118, and the payment card 126, and send transaction information 134 over the one or more networks 106 to the service computing device 108. The transaction information 134 may include at least a transaction amount, i.e., the amount that the payment card account is being charged for the fuel dispensed and an account identifier (ID) associated with the payment card. The transaction information 134 may further include at least one of the price per unit of the fuel dispensed and/or the actual amount (volume or other quantity) of the fuel dispensed. Additionally, in some examples, the transaction information 134 may include a time at which the transaction took place, a location of the transaction, a name of the fuel vendor, and the like.

Thus, the system 100 may employ a processor on the vehicle, a fuel amount sensor on the vehicle, and at least one computing device, to provide a fleet manager 114 with information for determining a volume of fuel added to a remote vehicle 102, such as for validating the charges for the fuel. Accordingly, implementations herein provide an improvement to a conventional fuel gauge in a vehicle by making the amount of fuel added to the vehicle available externally to the fleet manager at a remote location in real time, e.g., at the time that the fuel is added. Thus, the fuel gauge arrangement herein with the reporter 104 and sensor incorporated may provide fuel quantity information not only to the cardholder associated with the vehicle 102, but also to the fleet management computing device 112 associated with the fleet manager 114.

In some examples, the service computing device 108 may include one or more servers, personal computers, or other types of computing devices that may be embodied in any number of ways. For instance, in the case of a server, the modules, other functional components, and at least a portion of data storage may be implemented on at least one server, such as in a cluster of servers, a server farm or data center, a cloud-hosted computing service, and so forth, although other computer architectures may additionally or alternatively be used. Thus, the service computing device 108 may be associated with the service provider 110, who may provide the fleet payment cards 126 and associated payment services to companies or other entities that operate fleets of vehicles 102. Accordingly, in some examples, the service computing device 108 may be a designated server associated with a fleet card company or other service provider 110 for managing payments for transactions completed using the payment cards 126. Alternatively, in other examples, the management computing device 112 associated with the fleet manager 114 may receive the transaction information 134 directly from the POS device 122, such as in the case that the fleet management computing device 112 also functions as the service computing device 108.

The service computing device 108 may include a transaction processing application 140 that may be executed on the service computing device 108, such as for receiving the transaction information 134 from the POS device 122. Based on the transaction information 134, the transaction processing module 140 may store the transaction information 134 and may cause payment to be made to an account associated with the fueling location 116 as payment for the dispensed fuel. For instance, the service computing device 108 may cause a bank (not shown in FIG. 1) associated with the service provider 110 to schedule an automated clearing house (ACH) payment or other type of payment to an account associated with the fueling location 116.

The transaction processing application 140 may associate the transaction information 134 with the payment card information 142 and fleet client information 144. For instance, the transaction processing application 140 may add a charge for the amount of the transaction to an account of the fleet client based on the transaction information 134 received from the POS device 122. In addition, the transaction processing application 140 may save transaction information 146, which may include at least a portion of the transaction information 134. For instance, the transaction information 146 may include information about the transaction, such as the payment amount of the transaction, a time associated with the transaction, and at least one of the price per unit of the fuel purchased and/or the actual amount (e.g., volume or other quantity) of the fuel purchased.

In some examples, the transaction processing application 140 may automatically send the transaction information 146 to the management computing device 112 of the fleet manager 114, such as via one or more APIs. In other examples, the fleet manager 114 may use a browser or the like on the management computing device 112 to access the service computing device 108 to obtain the transaction information 146. In some examples, in addition to the information discussed above, the transaction information 146 may further include identifying information such as at least one of an identifier associated with the payment card 126 (payment card ID), an identifier associated with the vehicle 102 (vehicle ID), and/or an identifier associated with the cardholder 124 (cardholder ID).

The management computing device 112 may include a fuel management application 150 that may be executed on the management computing device 112, such as for receiving the transaction information 146 from the service computing device 108. Further, in some examples, the fuel management application 150 may receive the fuel amount report 132 from the reporter 104. In some examples, the fuel amount report 132 may include a vehicle ID of the vehicle 102, or other identifier, a time stamp of the time when the fuel was added, and so forth. The fuel management application 150 may store the fuel amount report 132 and the transaction information 146 as reports 152. The fuel management application 150 may further associate the reports 152 with cardholder information 154, payment card information 156, and/or vehicle information 158. For example, the fuel management application may determine the cardholder 124 who added the fuel to the vehicle, to which vehicle 102 in the fleet the fuel was added, and which payment card 126 was used to pay for the fuel.

The fuel management application 150 may compare the transaction information 146 with the fuel amount report 132. In particular, the fuel management application may determine the fuel amount reported by the reporter 104 and may compare this with the fuel amount determined from the transaction information 146. In some examples, the fuel management application 150 may apply a threshold tolerance by which the two fuel amounts may differ before a determination is made that there is a discrepancy between the fuel amount reported by the reporter 104 and the fuel amount reported in the transaction information 146. Alternatively, in some examples, the service computing device 108 may receive the fuel amount report 132 and perform the comparison of the two fuel amounts.

In addition, the cardholder 124 may be associated with a cardholder device 160, such as a cell phone, smart phone, tablet computing device, laptop, PC, or other computing device. In some cases, the cardholder 124 may use the cardholder device 160 for accessing the service computing device(s) 108 and/or the management computing device(s) 112, such as for determining transaction information for transactions associated with an account of the payment card 126 and/or the cardholder 124.

Additionally, in some examples, rather than using the payment card 126 to make payment for the fuel, the cardholder 124 may use the cardholder device 160. For example, the cardholder device 160 may include a mobile payment application or other mobile payment capability, such as a digital wallet, that may be linked to a fleet card payment account and/or the payment card 126. Consequently, the cardholder 124 may use the mobile payment application on the cardholder device 160 in a manner similar to that of the payment card 126 discussed above.

The one or more networks 106 may include any appropriate network or combination thereof, including a wide area network, such as the Internet; a local area network, such an intranet; a wireless network, such as a cellular network, a local wireless network, such as Wi-Fi and/or short-range wireless communications, such as BLUETOOTH®; a wired network, including fiber optics and Ethernet; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, reporter 104, the management computing device 112, the service computing device 108, the POS device 122, the card reader 120, and/or the cardholder device 160 are able to communicate over the one or more networks 106 using wired or wireless connections, and combinations thereof.

In some examples, the reporter 104 may communicate with the network 106 through a cellular communication interface included in the vehicle 102, or other type of wireless transmissions. For instance, many vehicles already include a cellular transceiver as standard equipment that may be used to transmit the fuel amount report 132 from the reporter 104 to the computing device(s) 108 and/or 112 such as via a cell tower 162. Alternatively, the reporter 104 may include a designated cellular transmitter.

The threshold tolerance mentioned above for the difference between the reported fuel amount and the amount in the transaction information may allow for a margin of error that may be specified by the fleet manager 114. The threshold may encompass errors that might have surfaced when determining calibration information for the reporter based on the shape of the fuel tank and the accuracy of the fuel gauge sending unit. For example, since not all fuel tanks adhere to a geometrical shape, calibration of fuel tanks for all vehicle models in a fleet may not be straight forward and may result in accumulation of errors throughout the calibration and measuring procedure. Accordingly, the threshold tolerance may be determined to account for the possibility of these accumulated errors.

Fuel payment cards 126 may be assigned to individual cardholders 124 and/or vehicles 102. In some examples, each fuel payment card 126 may include a unique or otherwise individually distinguishable RFID tag 128 that may indicate an account ID that is used to relate the fuel payment card 126 with the transactions made using the payment card 126 and other payment card information 142 and 156, such as the name of the cardholder 124 and/or the ID of the vehicle 102 associated with the payment card 126, the fleet client with which the cardholder 124 and/or the vehicle 102 are associated, any spending limits or other policies associated with the card account, the cardholder, and/or the vehicle, and so forth.

In some examples, after the cardholder 124 uses the payment card 126 to purchase fuel, the fuel amount report 132 and the transaction information 134 may be sent in near real time to the service computing device 108. The service computing device 108 may relate the received transaction information 134 and fuel amount report 132, and may store the received information as the transaction information 146. In some cases, the management computing device 112 may access the transaction information 146, such as with a browser through a web interface 164. The transaction information 146 may be accessed later for viewing payment card statements and fuel amount report information, such as by the cardholder 124 and/or the fleet manager 114 who may desire to validate the entries on a specific card. In some examples, the transaction processing application 140 may compare the fuel amount in the fuel amount report 132 with the fuel amount in the transaction information 134, and may send a notification or other communication to the management computing device 112 if a difference larger than the threshold tolerance is noted.

Alternatively, in some examples, the fuel amount report 132 may be sent directly to the management computing device 112. In this case, the transaction information 146 may include at least some of the transaction information 134. Further, the service computing device 108 may forward the transaction information 146 to the management computing device 112. In some cases, the transaction information 146 may be sent to the management computing device 112 in near real time, e.g., as the transaction information 134 is received at the service computing device 108 from the POS device 122. The management computing device 112 may store the fuel amount report 132 and the transaction information 146 as the reports 152. The fuel management application 150 may correlate a particular fuel amount report with particular transaction information 146, such as based on a time associated with the transaction, a payment card ID, an account ID, a cardholder ID, a vehicle ID, or the like. In this case, fuel management application 150 may compare the fuel amount in the fuel amount report 132 with the fuel amount in the transaction information 146, and may generate a notification to the fleet manager 114 if a difference larger than the threshold tolerance is noted.

Accordingly, implementations herein provide an improvement to the fuel gauges of fleet vehicles to enable the fuel gauge to provide fuel amount information over a network to remote computing devices that are remote from the vehicle. The amount of fuel added during a refill may be reported over the network to a computing device that may crosscheck the received fuel amount data with transaction information provided by the fueling station. Thus, based on the provided information, some examples are able to detect possible discrepancies in the use of fuel payment cards.

Figure 2:
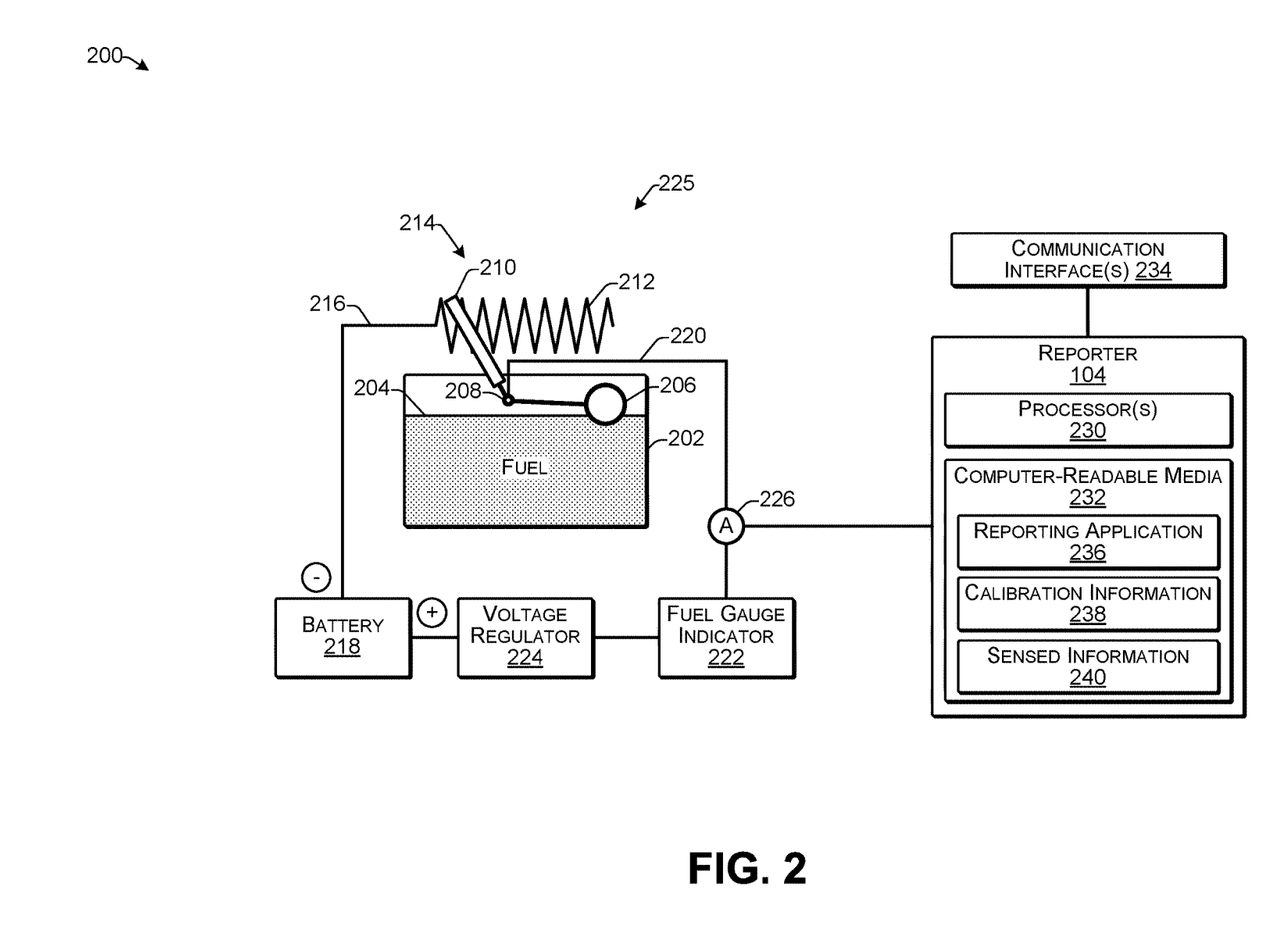
FIG. 2 illustrates an example fuel gauge apparatus include a reporter according to some implementations.

FIG. 2 illustrates an example fuel gauge apparatus 200 including a reporter according to some implementations. Fuel gauge apparatus 200 includes a fuel tank 202 for containing a quantity of fuel 204. As the level of the fuel 204 within the tank 202 rises and falls, a float 206 may change position within the tank 202. The float 206 may be connected through a pivot point 208 to a wiper or other moveable contact 210 that is in electrical contact with a resistor 212 to form a variable resistor 214. In some examples, the resistor 212 may be printed conductive ink. As the position of the float 206 changes in the tank 202 due to a change in the level of the fuel 204, the movable contact 210 changes position with respect to the resistor 212 to change the resistance of the variable resistor 214. As the resistance of the variable resistor 214 changes, the current passing through the variable resistor 214 also changes. As one example, as the fuel level falls, the resistance of the variable resistor increases. Other designs may use an opposite correlation.

A first conductor 216 connects a battery 218 or other power source to a first side of the variable resistor 214, and a second conductor 220 is connected to a second side of the variable resistor 214, e.g., at the movable contact 210. The second conductor 220 connects to a fuel gauge indicator 222, such as may be used present an indication of the current fuel level to a driver of the vehicle. Furthermore, a voltage regulator 224 may be connected in the circuit, such as between the fuel gauge indicator 222 and the battery 218 to maintain a consistent voltage in the circuit. Together, the float and variable resistor may be referred to as a sending unit 225.

In some examples herein, a sensor, such as an ammeter 226, may be connected to one of the first conductor 216 or the second conductor 220 to sense the current passing there through. The ammeter 226 may provide a signal indicative of the sensed current to the reporter 104. The reporter 104 may receive the sensed current and may determine a change in the volume of the fuel 204 in the fuel tank 202 based on a change in the sensed current. For instance, as the resistance in the variable resistor 214 increases, the amount of current detected by the ammeter 226 will decrease, which, in the illustrated example, indicates that the fuel level has diminished.

The reporter 104 may include at least one processor 230 and one or more computer readable media 232. In addition, the reporter 104 may be in communication with one or more communication interfaces 234. The processor 230 may be implemented as one or more microprocessors, microcomputers, microcontrollers, digital signal processors, central processing units, state machines, logic circuitries, and/or any devices that manipulate signals based on operational instructions. In some cases, the processor 230 may be one or more hardware processors and/or logic circuits of any suitable type specifically programmed or configured to execute the algorithms and processes described herein. The processor 230 may be configured to fetch and execute computer-readable, processor-executable instructions stored in the computer-readable media 232. As one non-limiting example, the processor 230 may be a vehicle ECU that is connected to the communication interface(s) 234 via a Controller Area Network (CAN bus).

The computer-readable media 232 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 232 may include, but is not limited to, RAM, ROM, EEPROM, flash memory, solid-state storage, magnetic disk storage, optical storage, and/or other computer-readable media technology. Accordingly, the computer-readable media 232 may be computer storage media able to store instructions, modules, or applications that may be executed by the processor 230. Further, when mentioned, non-transitory computer-readable media exclude media such as energy, carrier signals, electromagnetic waves, and signals per se.

The computer-readable media 232 may be used to store and maintain functional components that are executable by the processor 230. In some implementations, these functional components comprise instructions or programs that are executable by the processor 230 and that, when executed, implement operational logic for performing the actions and services attributed above to the reporter 104. Functional components of the reporter 104 stored in the computer-readable media 232 may include a reporting application 236 which may include a series of instructions and/or executable code for causing the processor 230 to perform the functions described herein.

In addition, the computer-readable media 232 may also store data, data structures and the like, that are used by the functional component(s). Data stored by the computer readable media 232 may include calibration information 238 that may be used by the report an application to relate a change in measured current and/or a change in resistance of the variable resistor 214 with a change in the volume of the fuel 204 in the fuel tank 202. Further, in some cases, the calibration information 238 may take into account the additional resistance that may be added by adding the ammeter 226 to the conductor 220 between the variable resistor 214 and the fuel gauge indicator 222. In addition, the computer readable media 232 may store sensed information 240, which may include sensor values obtained from the ammeter 226 before and after fuel 204 is added to the fuel tank 202. Further, the reporter 104 may include other logical, programmatic, and/or physical components, of which those described are merely examples that are related to the discussion herein.

The communication interface(s) 234 may include one or more interfaces and hardware components for enabling communication with various other devices, such as over the network(s) 106. For example, communication interface(s) 234 may enable communication through one or more of cellular networks, wireless networks (e.g., Wi-Fi) as well as short-range communications such as BLUETOOTH®, and the like, as additionally enumerated elsewhere herein. Alternatively, in some examples, the communication interface(s) 234 may include the ability to communicate through a wired network (e.g., fiber optic, Ethernet), such as in the case that the communication interfaces are connected to a wired connection that is used to read sensed information 240 directly from the reporter 104.

When the float 206 is near the top of the tank 202, the tank is full and the movable contact 210 on the variable resistor 214 may be positioned close to a grounded (negative) side. This may indicate that the resistance is small and a relatively large amount of current passes through the sending unit to the fuel gauge indicator 222. As the amount of fuel 204 in the tank 202 decreases, the float 206 drops, and the movable contact 210 moves to the right, causing the resistance to increase and the amount of current passing to the fuel gauge indicator to decrease.

In some examples, the fuel gauge indicator 222 may include an analog gauge that uses a bimetallic strip to change the position of a gauge needle based on the amount of current changing a configuration of the bimetallic strip, e.g., by heating of the bimetallic strip. In other examples, the fuel gauge indicator 222 may be a digital fuel gauge indicator that uses a microprocessor to read the output of the variable resistor and communicate with another processor that controls a dashboard display and/or a gauge needle.

As mentioned above, the volume of fuel 204 in the fuel tank 202 may be inversely proportional to the resistance of the variable resistor 214. The difference between the resistance value of the variable resistor 214 at the start of refueling and at the end of refueling (e.g., as measured by a change in the current at the ammeter 226) may be used along with information about the physical configuration of the fuel tank 202 to determine the amount of fuel added to the tank 202 during the refueling. Therefore, this determined amount of fuel may then be used to validate a fuel purchase made using a fuel payment card, such as to verify that the entire amount charged to the fuel payment card was used to refuel the designated vehicle. This information can be used to identify any fraudulent uses of the fuel payment card, and also to prevent mileage inconsistencies, such as the number of miles able to be traveled per tank of fuel.

As mentioned above, the shape of the fuel tank 202 may often be irregular and therefore the change in the volume of fuel may not necessarily closely correlate with the movement of the float 206 as the level of the fuel 204 changes in the tank 202. Accordingly, calibration information 238 may be determined based on testing of the fuel tank 202 and the sending unit 225 for each model of vehicle included in the vehicle fleet. For instance, the calibration information 238 may include a measured current and/or resistance for incremental volumes of fuel added to the fuel tank 202 such as on a granularity of, e.g., 500 mL increments, or the like. The calibration information may then be saved to the computer readable media 232 along with the reporting application 236, and may be used by the reporting application 236 for determining changes in the amount of fuel added to the fuel tank 202 based on comparing obtained sensor values obtained from the ammeter 226. Additional examples of determining the amount of fuel added and reporting the amount of fuel added are discussed below.

Furthermore, while a resistance-based fuel gauge is illustrated and described in this example, implementations herein may also be used with other types of fuel gauges such as capacitive fuel gauges. As one example, a capacitive gauge may include a plurality of low voltage tubular capacitor probes that use the fuel itself as a dielectric. At different fuel levels, different values of capacitance are measured and therefore the level of fuel can be determined. In this case, the reporter 104 may use a sensor that is able to sense a difference in capacitance values to measure the volume of fuel added, and the calibration information 238 may be determined for use with this sensor. Numerous other variations will be apparent to those of skill in the art having the benefit of the disclosure herein.

Figure 3:
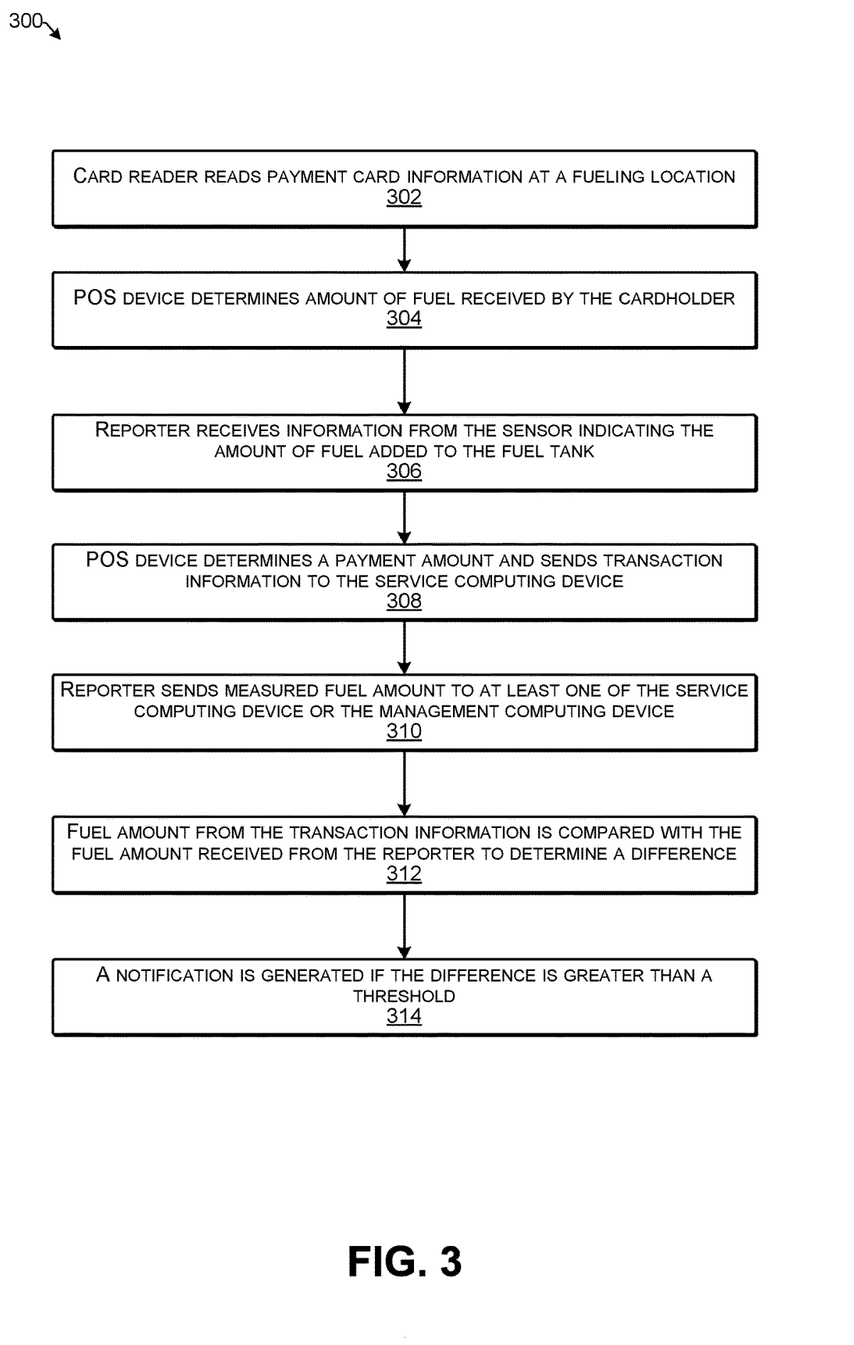
FIG. 3 is a flow diagram illustrating an example process for fuel management according to some implementations.
Figure 4:
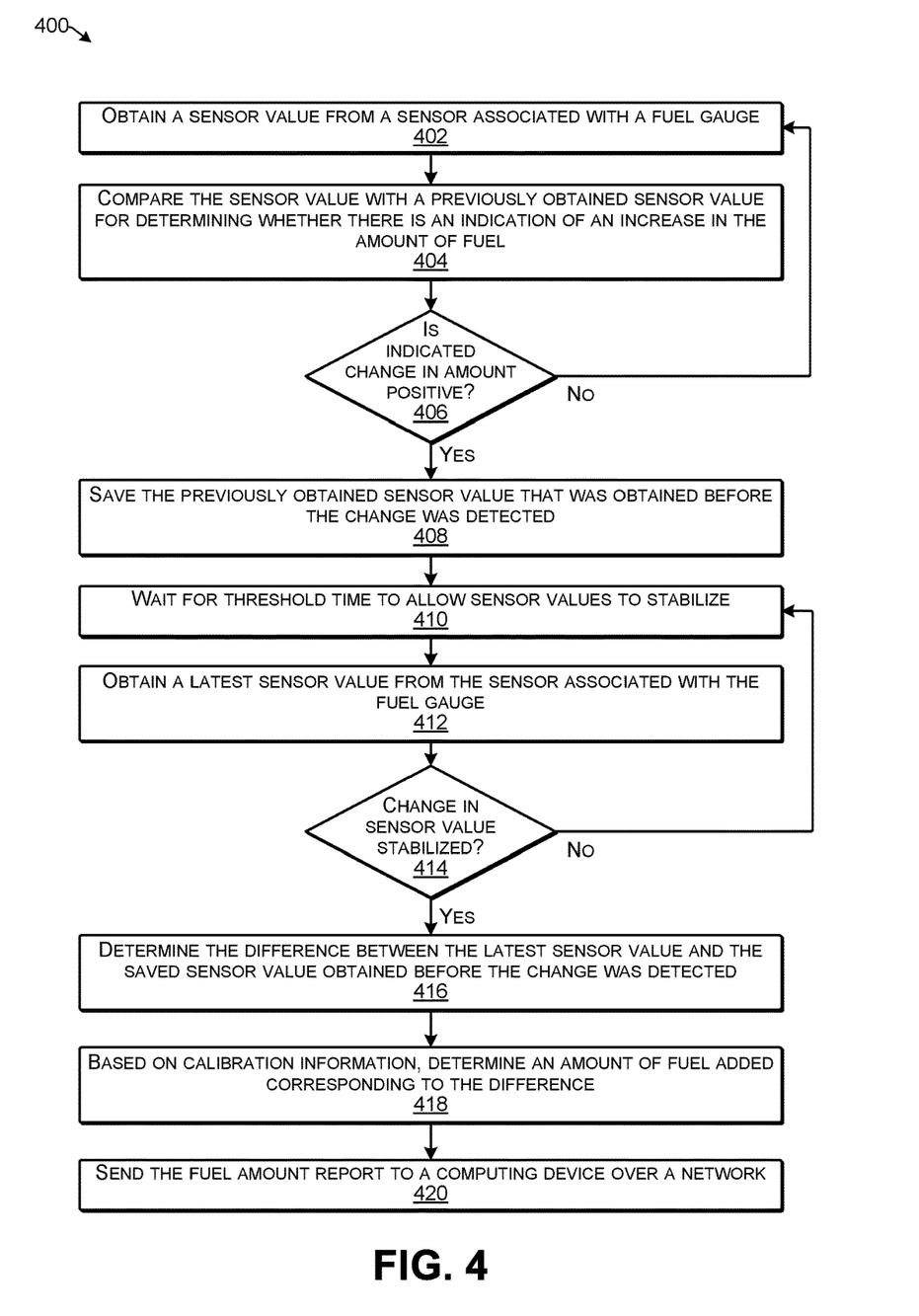
FIG. 4 is a flow diagram illustrating an example process for measuring fuel according to some implementations.
Figure 5:
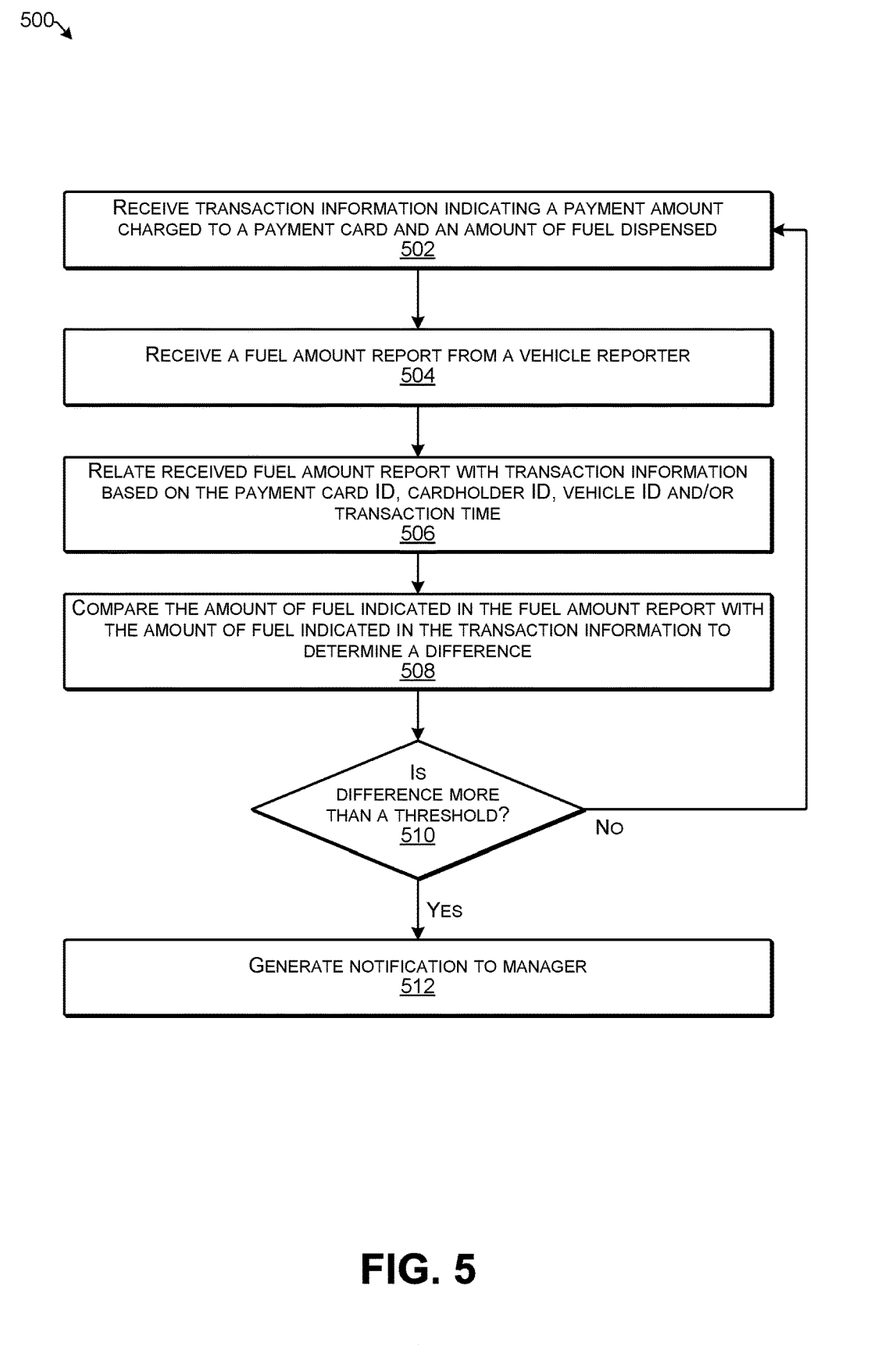
FIG. 5 is a flow diagram illustrating an example process for determining fuel discrepancies according to some implementations.

FIGS. 3-5 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

FIG. 3 is a flow diagram illustrating an example process 300 for fuel management according to some implementations. In some examples, the process may be executed, at least in part, by a POS device, the reporter, and at least one of the service computing device and/or the management computing device.

At 302, a card reader may read payment card information at a fueling location. For example, the operator of the vehicle or other cardholder may insert, swipe, or otherwise cause information on the payment card to be read by a card reader associated with a POS device and a fuel dispenser.

At 304, the POS device may determine an amount of fuel received by the cardholder. For example, the fuel dispenser may track the quantity of fuel dispensed to the vehicle, and the POS device may receive the fuel quantity information from the fuel dispenser to determine a price of the transaction.

At 306, the reporter in the vehicle may receive information from the sensor indicating the volume of fuel added to the fuel tank. For instance, the reporter processor may compare a sensor value from before the fuel is added and a sensor value after addition of fuel is complete, and may use the calibration information to determine the amount of fuel added. An example of this process is described below with respect to FIG. 4.

At 308, the POS device determines a payment amount and sends transaction information to the service computing device. For instance, the transaction information may include the payment amount and at least one of the price per unit or the quantity of fuel dispensed.

At 310, the reporter may send the measured fuel amount to at least one of the service computing device or the management computing device. For instance, the reporter may send the fuel amount report over a network to a computing device that is external to the vehicle, or otherwise remote from the vehicle.

At 312, the fuel amount from the transaction information may be compared with the fuel amount received from the reporter to determine a difference. An example process is discussed below with respect to FIG. 5.

At 314, if the difference is greater than a threshold, a notification may be generated, such as to inform a fleet manager of the difference.

FIG. 4 is a flow diagram illustrating an example process for measuring fuel according to some implementations. In some examples, the process may be executed at least in part by the reporter 104.

At 402, the reporter may obtain a sensor value from a sensor associated with the fuel gauge. For instance, in the case that the sensor is an ammeter, the reporter may obtain, a first value of a current indicative of a first resistance value for a variable resistor associated with a fuel gauge.

At 404, the reporter may compare the sensor value with a previously obtained sensor value for determining whether there is an indication of an increase in the amount of fuel. For instance, the reporter may determine that the fuel level is increasing based on determining at least one of: a difference between a first sensed current value and a second sensed current value, or a difference between a first resistance value and a second resistance value.

At 406, the reporter may determine whether an indicated change in the amount of fuel in the tank is positive. For instance, if there is the same amount or less fuel in the tank, then the reporter does not take any action, and the process returns to block 402.

At 408, if the change in the amount of fuel in the tank is indicated to be positive, the reporter may save the previously obtained sensor value that was obtained before the change was detected.

At 410, the reporter may wait for a threshold time to allow sensor values to stabilize. For instance, the reporter may wait for 30 seconds, 60 seconds, 90 seconds, etc., to ensure that the fuel level is stable and no longer increasing and not decreasing.

At 412, the reporter may obtain a latest sensor value from the sensor associated with the fuel gauge.

At 414, the reporter may determine whether a change in the sensor reading has stabilized. For instance, if the latest sensor value is the same as one or more next most recent sensor values, then the fuel level may be considered to be stabilized.

At 416, the reporter may determine the difference between the latest sensor value and the saved sensor value obtained before the change was detected. For instance, in the case of sensed current values, the first sensed current may be subtracted from the latest sensed current to determine a change in the current, which may indicate a change in the resistance of the variable resistor for a known voltage, e.g., based on Ohm's law.

At 418, based on calibration information, the reporter may determine the volume of fuel added corresponding to the determined difference. For instance, the calibration information may be based on current values, resistance values, or the like, that are correlated with different volumes of fuel in the fuel tank based on experimental information determined from a fuel tank and variable resistor have the same configuration. Consequently, in some examples, determining an amount of fuel added may include obtaining, from a sensor, a first value indicative of the fuel level in the vehicle before determining the fuel level is increasing; obtaining, from the sensor, a second value indicative of the fuel level in the vehicle after the fuel level has stabilized; and determining the amount of fuel added based on calibration information, the first value, and the second value. As mentioned above, the calibration information may be received by the reporter in advance, and may be based at least partially on a configuration of the fuel tank and the variable resistor associated with the fuel gauge for the model of the vehicle in which the reporter is located.

At 420, the reporter may send the fuel amount report to a computing device over a network. In some examples, the fuel amount report may include the measured amount of fuel added. Further, in some cases, the fuel amount report may include a vehicle ID, a cardholder ID, a time at which the fuel was added, and the like. The fuel amount report may be sent to at least one of the service computing device or the management computing device.

FIG. 5 is a flow diagram illustrating an example process for determining fuel discrepancies according to some implementations. In some examples, the process may be executed, at least in part, by the service computing device and/or the management computing device, or by another suitable computing device.

At 502, the computing device may receive transaction information indicating a payment amount charged to a payment card and an amount of fuel dispensed. For instance, the transaction information may include the price per unit of the fuel, the total quantity of fuel dispensed during the transaction, the time of the transaction, the name of the cardholder, the payment card ID or other account information, the location of the fueling location, the name of the fueling location, and so forth.

At 504, the computing device may receive the fuel amount report from the reporter in the vehicle. The fuel amount report may include the measured amount of fuel added. Further, in some cases, the fuel amount report may include a vehicle ID, a cardholder ID, a time at which the fuel was added, and the like.

At 506, the computing device may relate the received fuel amount report with transaction information based on the payment card ID, cardholder ID, vehicle ID, and/or a transaction time.

At 508, the computing device may compare the volume of fuel indicated in fuel amount report with the volume of fuel indicated in transaction information to determine difference. For example, the computing device may determine an absolute value of the difference between the two fuel amounts.

At 510, the computing device may determine whether the difference is more than a threshold. As mentioned above, a threshold tolerance may be used to accommodate possible errors in calibration accuracy, dispenser accuracy, sensor accuracy, or the like.

At 512, if the difference is more than the threshold, the computing device may generate a notification to a manager. For instance, in the case that the difference is determined by the service computing device, the service computing device may send the notification to the management computing device as an electronic communication that may be presented on a display associated with the management computing device.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 6:
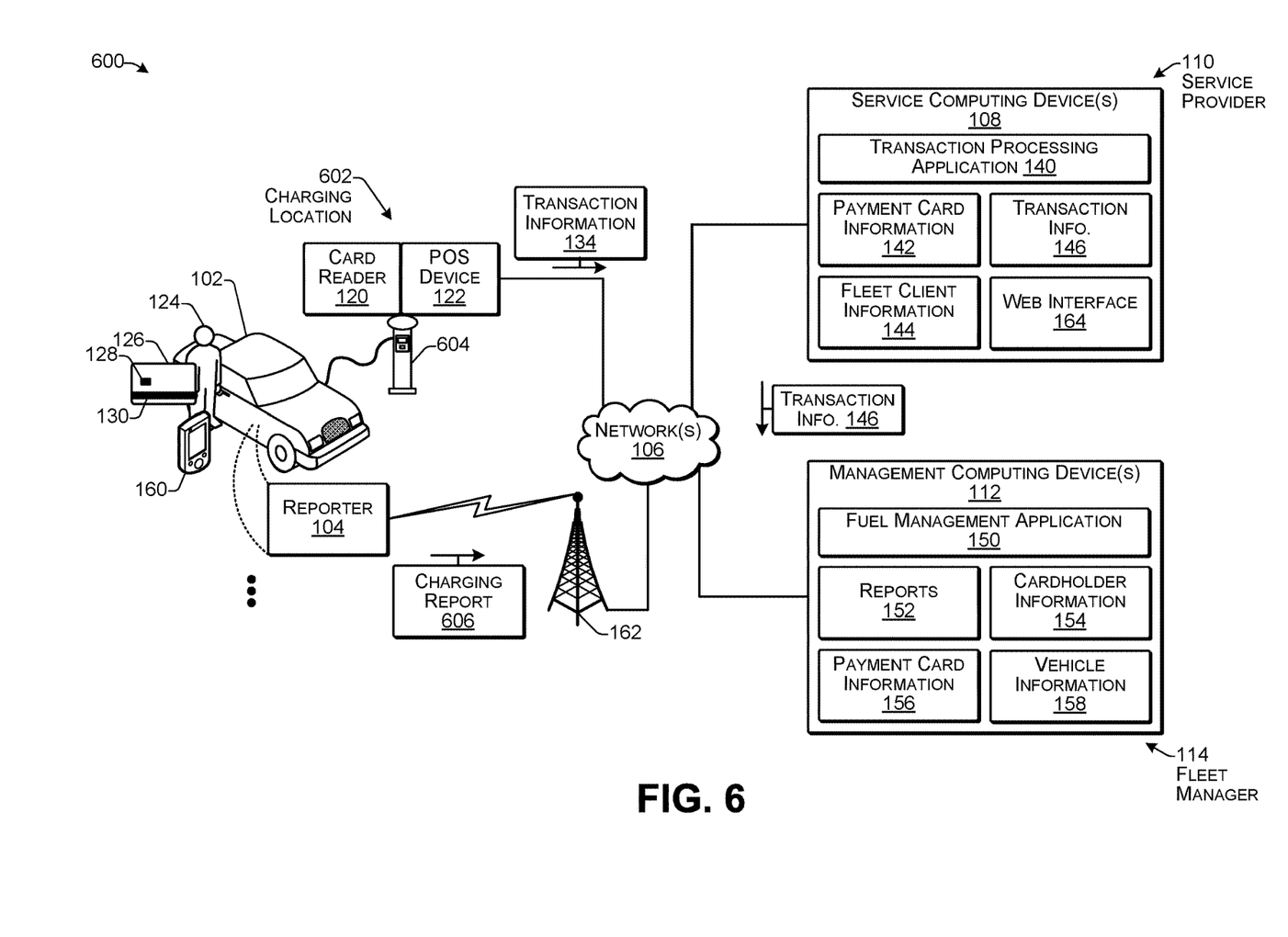
FIG. 6 illustrates an example system enabling fuel measurement according to some implementations.

FIG. 6 illustrates an example system 600 enabling fuel measurement according to some implementations. For example, the techniques discussed above may generally be extended to vehicles that employ other sources of energy such as electric vehicles, vehicles powered by solar energy, vehicles powered by hydrogen cells etc. The processes described above may be applied to validate a purchase made for fuels including electricity as a fuel. Thus, a purchase made using a fleet payment card to recharge an electric vehicle may also be validated using the procedure discussed above. Consequently, implementations herein are not limited to any one type of fuel or vehicle, and may be used effectively across various domains of vehicles. The reporter and sensor discussed above may be used to determine a percentage of the battery that is recharged in an electric vehicle and/or may be programmed to detect other types of inputs, depending on the design of the associated fuel gauge.

In this example, suppose that vehicle 102 is an electric powered vehicle that includes a rechargeable battery. The cardholder 124 may recharge the battery at a charging location 602 by connecting the vehicle 102 to a charging station 604, which serves as a fuel dispenser. In some cases, rather than sending a fuel amount report, the reporter 104 may send a charging report 606 that indicates how much electricity was received by the battery as well as other information about the battery. Furthermore, in this example, the reporter 104 may be connected to a battery level indicator of the vehicle 102 for determining the charge level of the battery before and after the charging is performed. Thus, the reporter 104 may determine a difference between a an electric charge (fuel) level of the battery before charging and an electric charge (fuel) level of the battery after charging is complete. Thus, the charging report 606 may be compared with the transaction information 146, in the same manner as discussed above.

In some of these examples, the charging report 606 may include, in addition to the battery levels before and after charging, other data such as battery performance information, battery life information, and so forth. For instance, the charging report may include the voltage at which the battery was charged, the duration for which the battery was charged, emergency battery parameters, etc. This information and/or other parameters may be used, such as in the case that the battery is overcharged so that the vehicle and/or the cardholder may be instructed to return to the nearest service center. For instance, in some cases, the vehicle identification number (VIN) of the vehicle may be used to track the vehicle 102 in the case of a discrepancy with the battery or detection of other unusual batter activity.

Figure 7:
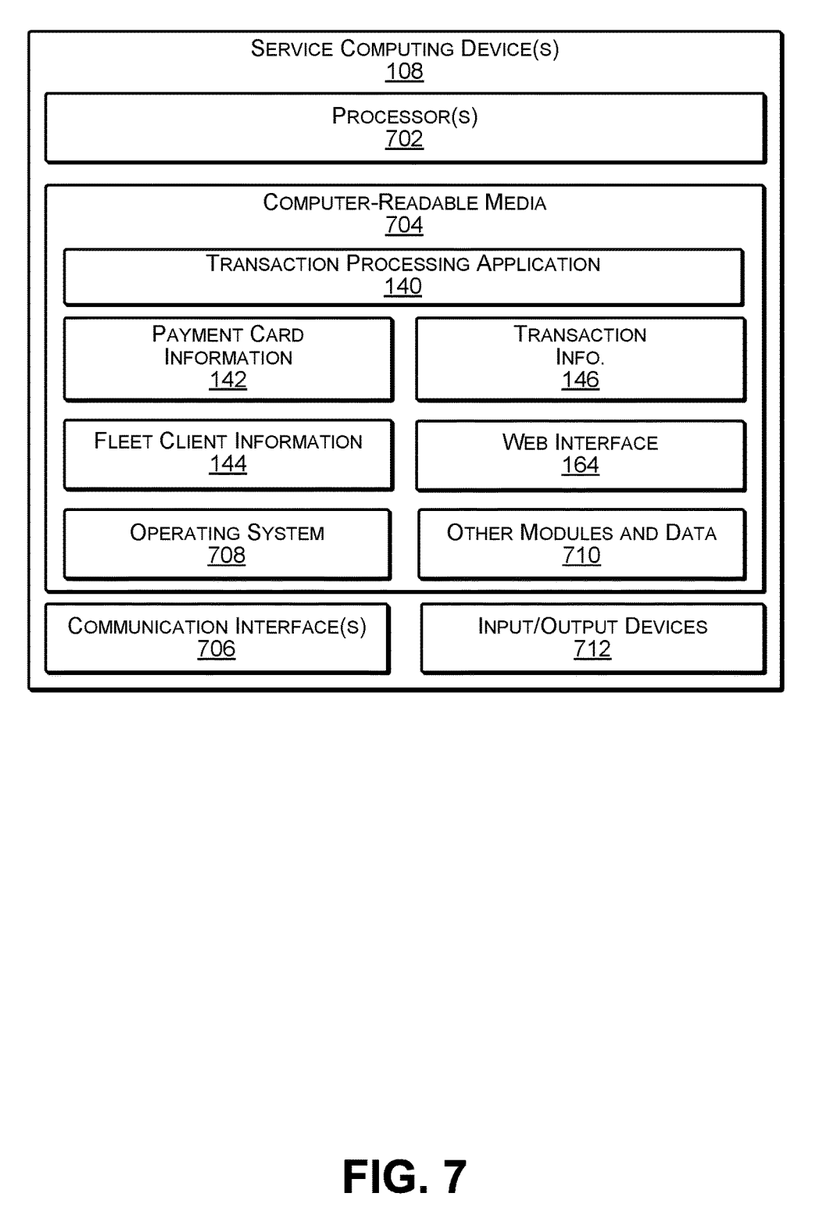
FIG. 7 illustrates select components of one or more example service computing devices according to some implementations.

FIG. 7 illustrates select components of the service computing device 108, which may be used to implement some functionality of the services described herein. The service computing device 108 may include one or more servers, personal computers, or other types of computing devices that may be embodied in any number of ways. For instance, in the case of a server, the modules, applications, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 108 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 108 may include one or more processors 702, one or more computer-readable media 704, and one or more communication interfaces 706. Each processor 702 may be a single processing unit or a number of processing units, and may include single or multiple computing units or multiple processing cores. The processor(s) 702 may be implemented as one or more microprocessors, microcomputers, microcontrollers, digital signal processors, central processing units, state machines, logic circuitries, and/or any devices that manipulate signals based on operational instructions. For instance, the processor(s) 702 may be one or more hardware processors and/or logic circuits of any suitable type specifically programmed or otherwise configured to execute the algorithms and processes described herein. The processor(s) 702 may be configured to fetch and execute computer-readable instructions stored in the computer-readable media 704, which may program the processor(s) 702 to perform the functions described herein.

The computer-readable media 704 may include volatile and nonvolatile memory and/or removable and non-removable media implemented in any type of technology for storage of information, such as computer-readable instructions, data structures, program modules, or other data. Such computer-readable media 704 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 108, the computer-readable media 704 may be a type of computer-readable storage media and/or may be a tangible non-transitory media to the extent that, when mentioned, non-transitory computer-readable media exclude media such as energy, carrier signals, electromagnetic waves, and signals per se.

The computer-readable media 704 may be used to store any number of functional components that are executable by the processors 702. In many implementations, these functional components comprise instructions or programs that are executable by the processors 702 and that, when executed, specifically configure the one or more processors 702 to perform the actions attributed above to the service computing device 108. Functional components stored in the computer-readable media 704 may include the transaction processing application 140 and the web interface 164. Additional functional components stored in the computer-readable media 704 may include an operating system 708 for controlling and managing various functions of the service computing device 108.

In addition, the computer-readable media 704 may store data used for performing the operations described herein. Thus, the computer-readable media 704 may store the payment card information 142, the fleet client information 144, and the transaction information 146. The service computing device 108 may also include or maintain other functional components and data not specifically shown in FIG. 7, such as other modules and data 710, which may include programs, drivers, etc., and the data used or generated by the functional components. Further, the service computing device 108 may include many other logical, programmatic, and physical components, of which those described above are merely examples that are related to the discussion herein.

The communication interface(s) 706 may include one or more interfaces and hardware components for enabling communication with various other devices, such as over the network(s) 106. For example, communication interface(s) 706 may enable communication through one or more of the Internet, cable networks, cellular networks, wireless networks (e.g., Wi-Fi) and wired networks (e.g., fiber optic and Ethernet), as well as short-range communications, such as BLUETOOTH®, and the like, as additionally enumerated elsewhere herein.

The service computing device 108 may further be equipped with various input/output (I/O) devices 712. Such I/O devices 712 may include a display, various user interface controls (e.g., buttons, joystick, keyboard, mouse, touch screen, etc.), audio speakers, connection ports and so forth.

Figure 8:
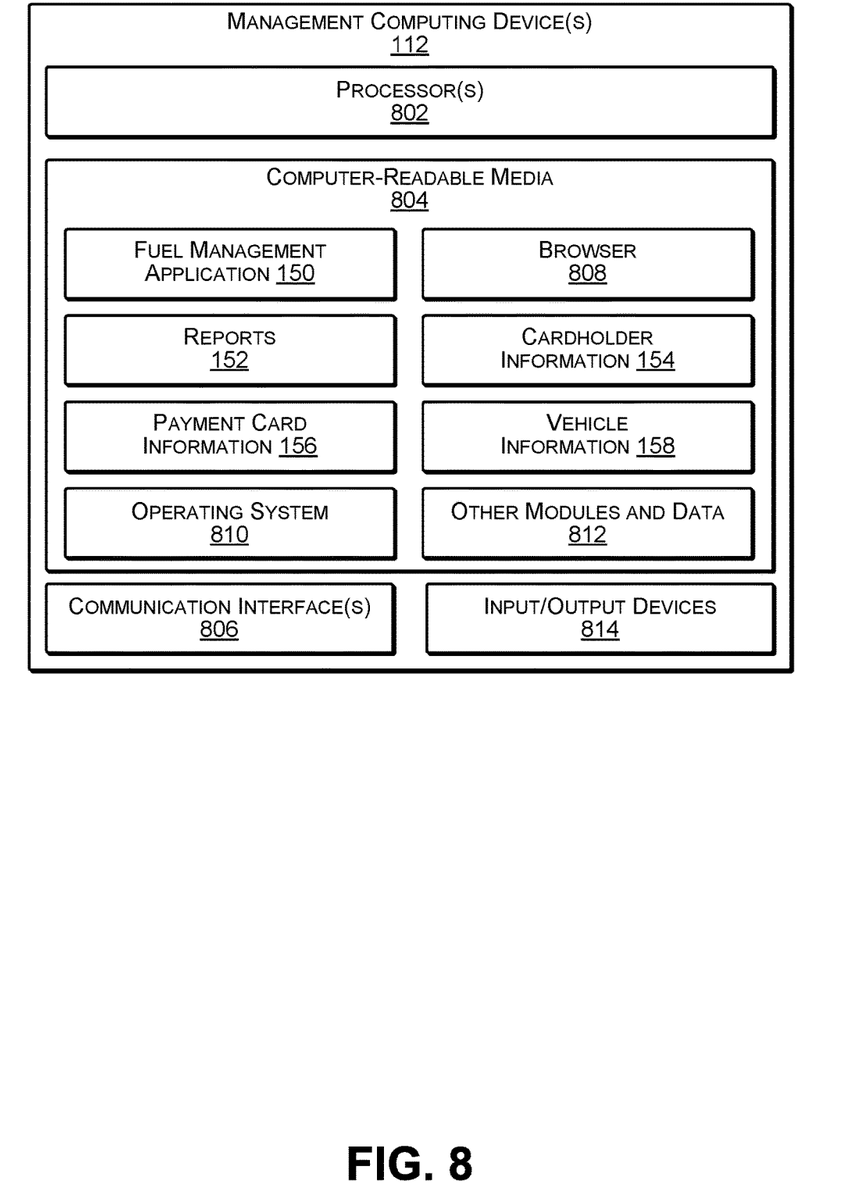
FIG. 8 illustrates select components of one or more example management computing devices according to some implementations.

FIG. 8 illustrates select components of the management computing device 112, which may be used to implement some functionality of the services described herein. The management computing device 112 may include one or more servers, personal computers, or other types of computing devices that may be embodied in any number of ways. For instance, in the case of a server, the modules, applications, other functional components, and data may be implemented on a single server, a cluster of servers, a server farm or data center, a cloud-hosted computing service, and so forth, although other computer architectures may additionally or alternatively be used.

Further, while the figures illustrate the components and data of the management computing device 112 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each management computing device 112 may include one or more processors 802, one or more computer-readable media 804, and one or more communication interfaces 806. Each processor 802 may be a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 may be configured to fetch and execute computer-readable instructions stored in the computer-readable media 804, which may program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the management computing device 112, the computer-readable media 804 may be a type of computer-readable storage media and/or may be a tangible non-transitory media to the extent that, when mentioned, non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed above to the management computing device 112. Functional components stored in the computer-readable media 804 may include the fuel management application 150 and a browser 808. For instance, the browser 808 may be used to access the web interface on the service computing device in some examples, such as for accessing transaction information and/or fuel amount reports. Additional functional components stored in the computer-readable media 804 may include an operating system 810 for controlling and managing various functions of the management computing device 112.

In addition, the computer-readable media 804 may store data used for performing the operations described herein. Thus, the computer-readable media 804 may store the reports 152, the cardholder information 154, the payment card information 156, and the vehicle information 158. The management computing device 112 may also include or maintain other functional components and data not specifically shown in FIG. 8, such as other modules and data 812, which may include programs, drivers, etc., and the data used or generated by the functional components. Further, the management computing device 112 may include many other logical, programmatic, and physical components, of which those described above are merely examples that are related to the discussion herein.

The communication interface(s) 806 may include one or more interfaces and hardware components for enabling communication with various other devices, such as over the network(s) 106. For example, communication interface(s) 806 may enable communication through one or more of the Internet, cable networks, cellular networks, wireless networks (e.g., Wi-Fi) and wired networks (e.g., fiber optic and Ethernet), as well as short-range communications, such as BLUETOOTH®, and the like, as additionally enumerated elsewhere herein.

The management computing device 112 may further be equipped with various input/output (I/O) devices 814. Such I/O devices 814 may include a display, various user interface controls (e.g., buttons, joystick, keyboard, mouse, touch screen, etc.), audio speakers, connection ports and so forth. Further, more in some cases, the cardholder device 160 may include similar hardware components, but with different functional components and data configured for carrying out the various functions thereof.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
a sensor associated with a vehicle;
a processor in communication with the sensor; and
one or more non-transitory computer-readable media maintaining executable instructions, which, when executed by the processor, program the processor to perform operations comprising:
  determining, based at least partially on the sensor, that a fuel level of the vehicle is increasing;
  determining that the fuel level has stabilized based on a threshold time;
  determining an amount of fuel added at a fueling location, wherein the fueling location is able to communicate with a first computing device; and
  sending, over a network to a second computing device, a communication indicating the amount of fuel added at the fueling location, wherein the second computing device is configured to determine whether to generate a notification based on the amount of fuel indicated in the communication and based on a message from the first computing device,
wherein determining the amount of fuel added comprises:
  obtaining, from the sensor, a first value indicative of the fuel level in the vehicle before determining the fuel level is increasing;
  obtaining, from the sensor, a second value indicative of the fuel level in the vehicle after the fuel level has stabilized; and
  determining the amount of fuel added based on calibration information, the first value, and the second value.

2. The system as recited in claim 1, wherein determining that the fuel level of the vehicle is increasing further comprises:
  obtaining, from the sensor, the first value indicative of the fuel level in the vehicle;
  obtaining, from the sensor, a third value indicative of the fuel level in the vehicle; and at least partially based on a comparison of the first value with the third value, determining that the fuel level of the vehicle is increasing.

3. The system as recited in claim 2, wherein the sensor is an ammeter, the operations further comprising:
obtaining, as the first value, a first current value indicative of a first resistance value for a variable resistor associated with a fuel gauge;
obtaining as the third value, a second current value indicative of a second resistance value for the variable resistor; and
determining that the fuel level is increasing based on determining at least one of:
a difference between the first current value and the second current value, or
a difference between the first resistance value and the second resistance value.

4. The system as recited in claim 1, wherein determining that the fuel level has stabilized based on a threshold time further comprises:
obtaining, from the sensor, a third value indicative of the fuel level in the vehicle;
obtaining, from the sensor, a fourth value indicative of the fuel level in the vehicle; and
determining that a difference between the third value and the fourth value is less than a threshold amount;
waiting for the threshold time;
obtaining, from the sensor, the second value indicative of the fuel level in the vehicle; and
determining that a difference between the second value and at least one of the third value or the fourth value is less than the threshold amount.

5. The system as recited in claim 1, the operations further comprising:
receiving the calibration information in advance, the calibration information based at least partially on a configuration of a fuel tank and a variable resistor associated with a fuel gauge for a model of the vehicle.

6. The system as recited in claim 1, wherein:
the fuel includes at least one of gasoline, diesel fuel, liquefied petroleum, compressed natural gas, ethanol, hydrogen, or biofuel; and
the second computing device is configured to compare an amount of fuel indicated in the message received from the first computing device with the amount of fuel indicated in the communication for determining a difference, and based on the difference being greater than a threshold amount, generate a notification.

7. A method comprising:
determining, by a processor associated with a vehicle, based at least partially on information from a sensor associated with the vehicle, that a fuel level of the vehicle is increasing;
determining that the fuel level has stabilized based on a threshold time;
determining an amount of fuel added at a fueling location, wherein the fueling location is able to communicate with a first computing device; and
sending, over a wireless network, to a second computing device, a communication indicating the amount of fuel added at the fueling location, the communication causing, at least in part, the second computing device to determine whether to generate a notification based on the amount of fuel indicated in the communication and based on a message from the first computing device, wherein:

the fuel includes at least one of gasoline, diesel fuel, liquefied petroleum, compressed natural gas, ethanol, hydrogen, biofuel, or electricity; and
the second computing device is configured to compare an amount of fuel indicated in the message from the first computing device with the amount of fuel indicated in the communication for determining a difference, and based on the difference being greater than a threshold amount, generate a notification.

8. The method as recited in claim 7, wherein determining that the fuel level of the vehicle is increasing comprises:
obtaining, from the sensor, a first value indicative of the fuel level in the vehicle;
obtaining, from the sensor, a second value indicative of the fuel level in the vehicle; and
at least partially based on a comparison of the first value with the second value, determining that the fuel level of the vehicle is increasing.

9. The method as recited in claim 8, wherein the fuel is a liquid and the sensor is an ammeter, the operations further comprising:
obtaining, as the first value, a first current value indicative of a first resistance value for a variable resistor associated with a fuel gauge;
obtaining as the second value, a second current value indicative of a second resistance value for the variable resistor; and
determining that the fuel level is increasing based on determining at least one of:
a difference between the first current value and the second current value, or
a difference between the first resistance value and the second resistance value.

10. The method as recited in claim 7, wherein determining that the fuel level has stabilized based on a threshold time comprises:
obtaining, from the sensor, a first value indicative of the fuel level in the vehicle;
obtaining, from the sensor, a second value indicative of the fuel level in the vehicle; and
determining that a difference between the first value and the second value is less than a threshold amount;
waiting for the threshold time;
obtaining, from the sensor, a third value indicative of the fuel level in the vehicle; and
determining that a difference between the third value and at least one of the first value or the second value is less than the threshold amount.

11. The method as recited in claim 7, wherein the fuel is a liquid and determining the amount of fuel added comprises:
obtaining, from the sensor, a first value indicative of the fuel level in the vehicle before determining the fuel level is increasing;
obtaining, from the sensor, a second value indicative of the fuel level in the vehicle after the fuel level has stabilized; and
determining the amount of fuel added based on calibration information, the first value, and the second value.

12. The method as recited in claim 11, further comprising:
receiving the calibration information in advance, the calibration information based at least partially on a configuration of a fuel tank and a variable resistor associated with a fuel gauge for a model of the vehicle.

13. A system comprising:
a sensor associated with a vehicle;
a processor in communication with the sensor; and one or more non-transitory computer-readable media maintaining executable instructions, which, when executed by the processor, program the processor to perform operations comprising:
- determining, based at least partially on the sensor, that a fuel level of the vehicle is increasing;
- determining that the fuel level has stabilized based on a threshold time;
- determining an amount of fuel added at the fueling location, wherein the fueling location is able to communicate with one or more computing devices; and
- sending, from the vehicle, over a network to the one or more computing devices, a communication indicating the amount of fuel added at the fueling location, wherein:
- the communication causes, at least in part, the one or more computing devices to compare an amount of fuel indicated in the communication from the vehicle with an amount of fuel indicated in transaction information sent by the fueling location for determining a difference, and based on the difference being greater than a threshold amount, generate a notification,
- wherein determining that the fuel level has stabilized based on a threshold time further comprises:
  - obtaining, from the sensor, a first value indicative of the fuel level in the vehicle;
  - obtaining, from the sensor, a second value indicative of the fuel level in the vehicle; and
  - determining that a difference between the first value and the second value is less than a threshold amount;
  - waiting for the threshold time;
  - obtaining, from the sensor, a third value indicative of the fuel level in the vehicle; and
  - determining that a difference between the third value and at least one of the first value or the second value is less than the threshold amount.

14. The system as recited in claim 13, wherein determining that the fuel level of the vehicle is increasing further comprises:
- obtaining, from the sensor, a fourth value indicative of the fuel level in the vehicle;
- obtaining, from the sensor, a fifth value indicative of the fuel level in the vehicle; and
- at least partially based on a comparison of the fourth value with the fifth value, determining that the fuel level of the vehicle is increasing.

15. The system as recited in claim 13, wherein determining the amount of fuel added comprises:
- obtaining, from the sensor, a fourth value indicative of the fuel level in the vehicle before determining the fuel level is increasing;
- obtaining, from the sensor, the third value indicative of the fuel level in the vehicle after the fuel level has stabilized; and
- determining the amount of fuel added based on calibration information, the fourth value, and the third value.

16. The system as recited in claim 15, the operations further comprising:
- receiving the calibration information in advance, the calibration information based at least partially on a configuration of a fuel tank and a variable resistor associated with a fuel gauge for a model of the vehicle.

17. The system as recited in claim 13, further comprising a cellular communication interface connected to the processor and able to communicate with a wireless network to enable the processor to send the communication over the network to the one or more computing devices.

* * * * *